(12) United States Patent
Schoenebeck (10) Patent No.: US 8,701,305 B1
(45) Date of Patent: Apr. 22, 2014

(54) LEVEL

(76) Inventor: Scott Schoenebeck, Salt Lake City, UT (US)

( * ) Notice: Subject to any disclaimer, the term of this patent is extended or adjusted under 35 U.S.C. 154(b) by 211 days.

(21) Appl. No.: 13/304,877

(22) Filed: Nov. 28, 2011

(51) Int. Cl.
*G01C 9/02* (2006.01)
*G01C 9/28* (2006.01)

(52) U.S. Cl.
USPC .................. 33/613; 33/347; 33/371; 33/373

(58) Field of Classification Search
USPC .................... 33/613, 347, 370–373
See application file for complete search history.

(56) References Cited

U.S. PATENT DOCUMENTS

| | | | | |
|---|---|---|---|---|
| 2,535,791 A | * | 12/1950 | Fluke | 33/347 |
| 3,057,250 A | * | 10/1962 | Griffith | 356/255 |
| 3,589,021 A | * | 6/1971 | Hall, Sr. | 33/372 |
| 3,707,772 A | * | 1/1973 | Cotter | 33/373 |
| 4,100,681 A | | 7/1978 | Hollander | |
| 4,208,802 A | | 6/1980 | Berndt | |
| 4,228,982 A | * | 10/1980 | Sellera | 248/467 |
| 4,473,957 A | * | 10/1984 | Faulkner | 33/666 |
| 4,580,350 A | | 4/1986 | Fincher | |
| 4,593,475 A | * | 6/1986 | Mayes | 33/347 |
| 4,663,856 A | | 5/1987 | Hall et al. | |
| 4,829,676 A | | 5/1989 | Waldron | |
| 4,944,094 A | | 7/1990 | Depiano et al. | |
| 4,989,332 A | | 2/1991 | Worrallo | |
| 4,991,278 A | | 2/1991 | Hendrix | |
| 5,207,004 A | * | 5/1993 | Gruetzmacher | 33/379 |
| 5,255,443 A | * | 10/1993 | Schmidt | 33/373 |
| 5,303,895 A | | 4/1994 | Hart | |
| 5,421,094 A | * | 6/1995 | McCord et al. | 33/373 |
| 5,454,542 A | | 10/1995 | Hart | |
| D368,666 S | | 4/1996 | Fonte | |
| 5,524,353 A | | 6/1996 | Fink | |
| 5,799,404 A | | 9/1998 | Payne | |
| 5,819,425 A | | 10/1998 | Payne | |
| 5,848,489 A | | 12/1998 | Hartley et al. | |
| 6,032,378 A | | 3/2000 | Null | |
| 6,131,298 A | | 10/2000 | McKinney et al. | |
| 6,138,369 A | | 10/2000 | Mushin | |
| 6,205,669 B1 | | 3/2001 | Sollars et al. | |
| 6,502,322 B2 | | 1/2003 | Smochek | |
| 6,568,095 B2 | | 5/2003 | Snyder | |
| 6,719,260 B1 | | 4/2004 | Hart | |
| 6,739,065 B2 | * | 5/2004 | Hofmeister et al. | 33/613 |
| 6,796,045 B2 | | 9/2004 | Hallee | |
| 6,918,187 B2 | | 7/2005 | Schaefer | |
| 7,059,059 B1 | | 6/2006 | Ames | |
| 7,117,606 B2 | * | 10/2006 | Brown | 33/365 |
| 7,171,755 B1 | | 2/2007 | Arent et al. | |
| 7,555,842 B1 | | 7/2009 | Asay | |
| 7,562,462 B2 | | 7/2009 | Gentleman et al. | |

(Continued)

OTHER PUBLICATIONS

Attach-It, Instruction Details; http://www.barnaclecompany.com/picture_hanger.htm; as accessed Mar. 20, 2012; 6 pages.

(Continued)

*Primary Examiner* — Christopher Fulton
(74) *Attorney, Agent, or Firm* — Thorpe North & Western LLP (57) ABSTRACT

A level has a pair of knobs extending beyond a housing on opposite sides thereof to receive a strap. The level also has a bottom with a V-shaped profile to set atop a flat surface or receive a convex surface therein.

21 Claims, 5 Drawing Sheets

(56) References Cited

U.S. PATENT DOCUMENTS

| | | |
|---|---|---|
| 7,644,506 B2 | 1/2010 | Wong |
| 7,676,940 B2 * | 3/2010 | Spaulding et al. .............. 33/373 |
| 7,775,899 B1 | 8/2010 | Cannon |
| 2002/0066199 A1 | 6/2002 | Hanson |
| 2004/0084598 A1 | 5/2004 | Dodig, Jr. |
| 2006/0059758 A1 | 3/2006 | Zacharias |
| 2006/0254066 A1 | 11/2006 | Lang |
| 2007/0164080 A1 | 7/2007 | Young |

OTHER PUBLICATIONS

Attach-It; 2 pages; as accessed on Nov. 19, 2008.

* cited by examiner

LEVEL

BACKGROUND

1. Field of the Invention

The present invention relates generally to a level.

2. Related Art

Hanging a picture frame or the like on a wall can be a difficult process because it is difficult to accurately gauge if the frame is level with the unaided eye; and because levels are often large and unwieldy when used with picture frames. Levels have been proposed in which a flap is attached to a level and inserted between the picture frame and the glass. For example, see the Level-It™ level. Other levels have been proposed with various different means for securing the level, including clips and hook-and-loop fastening straps and shaped bodies. For example, see U.S. Pat. Nos. 4,829,676; 7,562,462; 4,663,856; 6,918,187; 7,644,506; 7,555,842; and 6,131,298.

SUMMARY OF THE INVENTION

It has been recognized that it would be advantageous to develop a level and method for leveling to facilitate hanging items, such as picture frames and towel bars, on a surface, such as a vertical wall.

The invention provides a level with an elongated, transparent, liquid-filled tube with an air bubble therein and having a longitudinal axis. A housing carries the tube and has a bottom and a back and is open along a majority of a top and a front so that the air bubble is visible in the tube. A pair of knobs extends beyond the housing on opposite sides thereof parallel with the longitudinal axis of the tube. Each of the pair of knobs has an enlarged distal head.

In addition, the invention provides a level with an elongated, transparent, liquid-filled tube with an air bubble therein and having a longitudinal axis. A housing carries the tube and has a bottom and a back and is open along a majority of a top and a front so that the air bubble is visible in the tube. A fin extends from the housing. The fin has a top edge with a pair of spaced-apart, uppermost top edges separated by a concave indentation in the top edge.

In addition, the invention provides a level with an elongated, transparent, liquid-filled tube with an air bubble therein and having a longitudinal axis. A housing carries the tube and has a bottom and a back and is open along a majority of a top and a front so that the air bubble is visible in the tube. A pair of knobs extends beyond the housing on opposite sides thereof parallel with the longitudinal axis of the tube. Each of the pair of knobs has an enlarged distal head. A pair of opposite feet arrays extends from the bottom of the housing and includes front and rear feet arrays. The front feet array has front feet arrayed along a front of the bottom. The rear feet array has rear feet arrayed along a rear of the bottom and off-set with respect to the front feet array. Each feet array has a tall portion at the respective front or rear of the bottom, and an inclined bottom tapering to a shorter raised portion towards a middle of the bottom, defining an inverted V-shaped profile when viewed from the side. The pair of knobs has a common axis parallel with an apex of the inverted V-shaped profile of the pair of opposite feet arrays. The pair of knobs is located immediately above the apex of the inverted V-shaped profile of the pair of opposite feet arrays. A fin extends from the back of the housing behind the tube. The fin has a top beveled edge with a majority forming a concave profile when viewed from the front.

Furthermore, the invention provides a method for leveling a hangable item including obtaining a level having an elongated, transparent, liquid-filled tube with an air bubble therein and having a longitudinal axis. A housing carries the tube and has a bottom and a back and is open along a majority of a top and a front so that the air bubble is visible in the tube. A pair of knobs extends beyond the housing on opposite sides thereof parallel with the longitudinal axis of the tube. Each of the pair of knobs has an enlarged distal head. A pair of opposite feet arrays extend from the bottom of the housing and includes front and a rear feet arrays. The front feet array has front feet arrayed along a front of the bottom. The rear feet array has rear feet arrayed along a rear of the bottom, and off-set with respect to the front feet array. Each feet array has a tall portion at the respective front or rear of the bottom, and an inclined bottom tapering to a shorter raised portion towards a middle of the bottom, defining an inverted V-shaped profile when viewed from the side. A fin extends from a back of the housing behind the tube. The level is secured to the hangable item by selecting a securing configuration selected from: 1) placing the level on a flat upper surface of the hangable item with the tall portion of the pair of opposite feet arrays disposed on the flat upper surface; or 2) placing the level on a convex upper surface of the hangable item with the inclined bottom of the inverted V-shaped profile of the pair of opposite feet arrays receiving the convex upper surface; and wrapping an elongated strap around the hangable item and the pair of knobs; or 3) inserting and wedging the fin of the level between opposing faces of the hangable item. The hangable item is adjusted until the air bubble in the level is centered. The position of the hangable item is marked, or the hangable item is secured in place.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein:

FIG. 1a is a front view of a level in accordance with an embodiment of the present invention;

FIG. 1b is an end view of the level of FIG. 1a;

FIG. 1c is an exploded view of the level of FIG. 1a;

FIG. 2a is a front view of a housing of the level of FIG. 1a;

FIG. 2b is a bottom view of the housing of the level of FIG. 1a;

FIG. 2c is an end view of the housing of the level of FIG. 1a;

FIG. 2d is a rear view of the housing of the level of FIG. 1a;

FIG. 2e is a top perspective view of the housing of the level of FIG. 1a;

FIG. 3a is a front view of the level of FIG. 1a, shown disposed on a hangable item with a convex upper surface, namely a towel rod;

FIG. 3b is a side view of the level of FIG. 1a, shown disposed on a hangable item with a convex upper surface, namely a towel rod;

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

As illustrated in FIGS. 1a-8, a level, indicated generally at 10, in an example implementation in accordance with the invention is shown for leveling, and subsequently hanging hangable items, such as pictures, picture frames 14 (FIGS. 4a-7), shelves, towel bars 18 (FIGS. 3a-3b), etc. on a surface, such as a vertical wall. The level is configured to allow hands free use of the level.

Figures 1A, 1B, 1C:
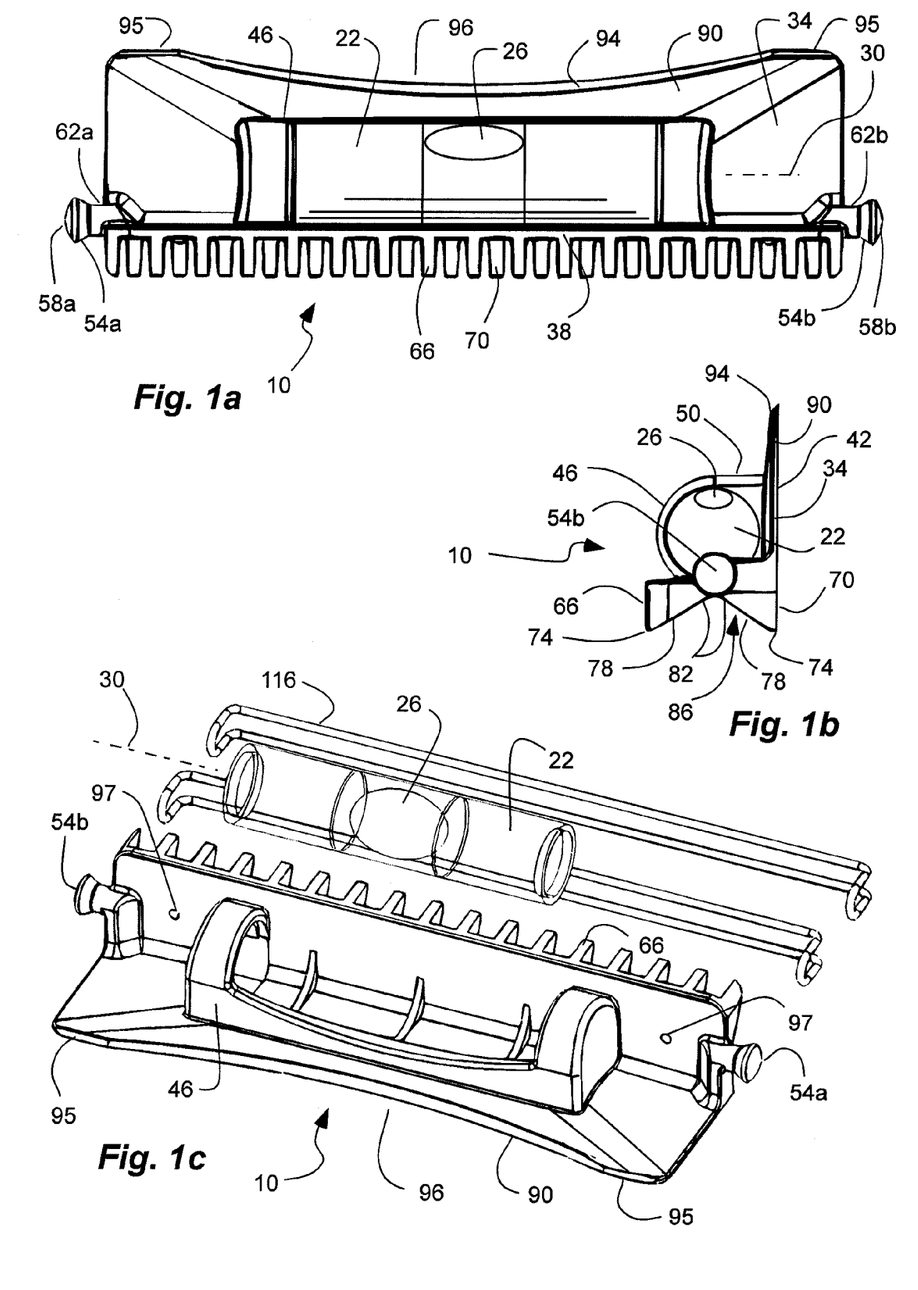

The level 10 includes an elongated, transparent, liquid-filled tube 22 with an air bubble 26 therein and having a longitudinal axis 30. The tube can be a cylindrical vial with the longitudinal axis concentric with the axis of the cylinder. The cylinder can be glass or plastic, and transparent or at least translucent. Thus, the liquid and air bubble are visible through the tube or vial. The tube or vial can have markings that can define a center region that can bound the air bubble, typically in a center of the tube or vial, to indicate level. The term air bubble is used broadly herein to refer to any material or object in the main liquid in the tube or vial, and can include air, or another type of liquid, and that is buoyant in the main liquid. The main liquid can be water or oil, and can be colored to facilitate visibility of the bubble.

Figure 2A:
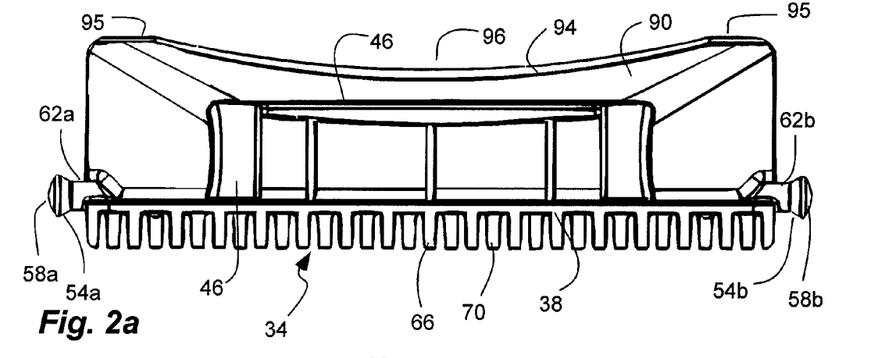
Figures 2B, 2C:
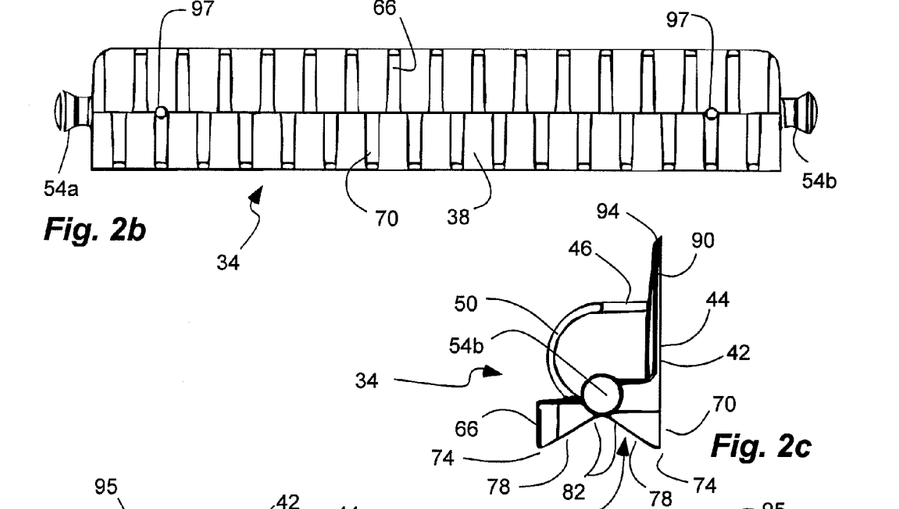
Figure 2D:
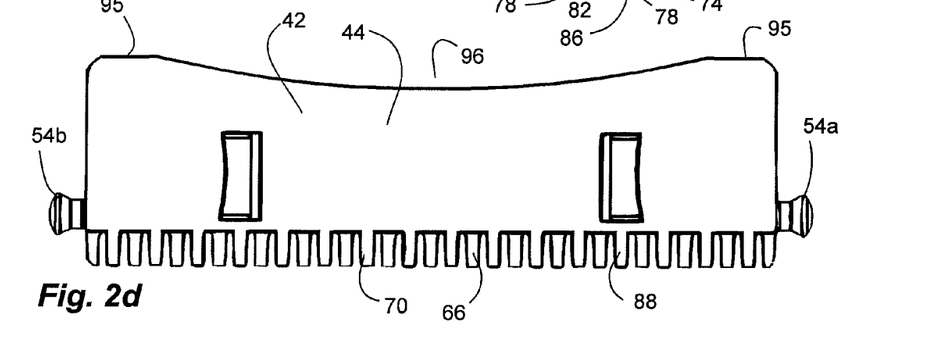

The tube 22 or vial can be carried by a housing 34. The housing 34 can have a bottom 38 and a back 42. The housing, or the bottom and the back thereof, can form a right angle or L-shape with the tube or vial held in the convergence of the angle or L-shape. Thus, the housing can be a bracket. The back 42 can have a flat back surface 44 (FIG. 2d). In addition, the housing can be open, or can have opening, along a majority of a top 46 and a front 50 so that a majority of the tube is visible, and the air bubble is visible in the tube. A pair of spaced-apart loops can be formed between the back 42 and the bottom 38 to loop around the opposite ends of the tube to secure the tube to the housing. The top 46 of the housing 34 can be defined by a top of the tube and/or a top of the loops. The loops on opposite sides of the tube can facilitate grasping and holding of the level. The housing can be formed of plastic in a molding process, such as injection molding.

A pair of knobs 54a and 54b or nubs extend beyond the lateral sides of the housing on opposite sides of the housing. The knobs can be collinear (or can share a common axis) and can be parallel with the longitudinal axis 30 of the tube. Each of the knobs can have an enlarged distal head 58a and 58b coupled to the housing by a narrower proximal neck 62a and 62b. The knobs extending beyond the housing can receive fasteners or straps as discussed in greater detail below.

The bottom 38 of the housing can have a pair of opposite feet arrays extending from the bottom of the housing, including front and rear feet arrays 66 and 70. The front feet array 66 can have front feet arrayed along a front of the bottom, while the rear feet array 70 can have rear feet arrayed along a rear of the bottom. The front and rear feet arrays, or feet thereof, can be off-set with respect to one another, and can alternate with respect to one another. The plurality of feet can also provide for narrower profiles that can reduce shrinkage issues if the body is injection molded in plastic to maintain dimensional stability and flatness. Each feet array or feet thereof can have a tall portion 74 at the respective front or rear of the bottom, and an inclined bottom 78 tapering to a shorter raised portion 82 towards a middle of the bottom. The feet arrays define an inverted V-shaped profile 86 when viewed from the side. The V-shaped profile 86 is elongated and can extend the length of the body or bottom. Thus, the V-shaped profile 86 can be an elongated V-shaped groove or channel that is segmented or has segmented walls defined by the bottoms 78 of the feet. The pair of knobs 54a and 54b can have a common axis parallel with an apex of the inverted V-shaped profile 86 of the pair of opposite feet arrays. In addition, the pair of knobs 54a and 54b can be located immediately above the apex of the inverted V-shaped profile 86 of the pair of opposite feet arrays. Thus, a force exerted by fasteners or straps, as discussed in greater detail below, is balance on the V-shaped profile. The back 88 of the rear feet array 70 can be flush with the flat back surface 44 of the back 42.

A fin 90 can extend from the back 42 of the housing 34 behind the tube 22. The fin 90 can be formed by the back 42 of the housing extending upward beyond the tube. The fin 90 can have a top beveled edge 94 with a majority forming a concave profile when viewed from the front. The top edge 94 of the fin 90 can have a pair of spaced-apart, uppermost top edges 95 separated by a concave indentation 96 in the top edge. The pair of top edges 95, or line extending across the top edges, can be parallel with the top 46 of the housing 34. The fin can be used to removably secure the level 10 to a picture frame by press-fitting the fin between opposing faces of the picture frame. Thus, the fin allows the level to be removably secured to the picture frame in a hands free manner to allow the user to hold and/or manipulate the picture frame with the level secured thereto. The pair of top edges 95 of the fin can define a width therebetween greater than a length of the tube. Thus, the concave indentation in the top edge can be longer than the tube. In addition, the top edges 95 can form the outermost edges of the level. The pair of top edges 95 define uppermost, and outermost, points of contact that are spaced-apart to resist rocking, or a non-parallel orientation of the level, with respect to the hangable object when the top edges 95 abut the hangable item. The concave indentation can accommodate or avoid obstruction, such as staples securing a back or picture to a frame, in the hangable object. The fin 90, or back thereof, can form and/or be flush with the flat back surface 44 of the back 42.

As described above, the back 42 can have a flat back surface 44, including the back 88 of the rear feet array 70 and the fin 90, so that the back 42 of the level can be disposed on a flat surface.

Figure 8:
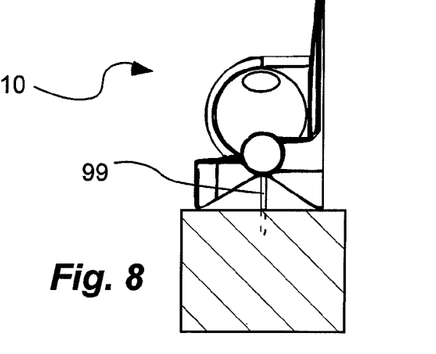
FIG. 8 is a side view of the level of FIG. 1a, shown secured to a longer board by a pin or thumb tack to create a longer level.

In addition, referring to FIG. 8, the level 10, such as the housing 34 and the bottom 38 thereof, can have an aperture 97, such as a pair of apertures, to receive fasteners, such as pins 99 or thumb tacks therethrough to secure the level to a longer straight edge, such as a length of wood, to form a longer level. For example, a pair of pins or thumb tacks can be removably inserted through the pair of apertures and into the wood of a board. As another example, the pins or tacks can be affixed to the level.

Figures 6, 7:
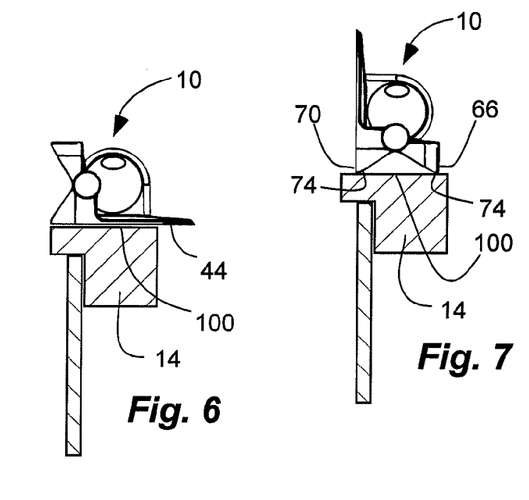
FIG. 6 is a side view of the level of FIG. 1a, shown disposed on a top surface of a hangable item, namely a picture frame.
FIG. 7 is a side view of the level of FIG. 1a, shown disposed on a top surface of a hangable item, namely a picture frame.

A method for leveling a hangable item and/or for using the level 10 described above, includes obtaining a level having one or more features as described above. The level 10 is secured to the hangable item by selecting a securing configuration. The level 10 can be secured by placing the level on a flat upper surface 100 of the hangable item (such as the picture frame 14 or shelf, etc.), as shown in FIGS. 6 and 7. The tall portion 74 of the pair of opposite feet arrays 66 and 70 can be disposed on the flat upper surface 100, as shown in FIG. 7. Alternatively, the flat back surface 44 of the back 42 of the level can be disposed on the flat upper surface 100, as shown in FIG. 6.

Figures 2E, 3A, 3B:
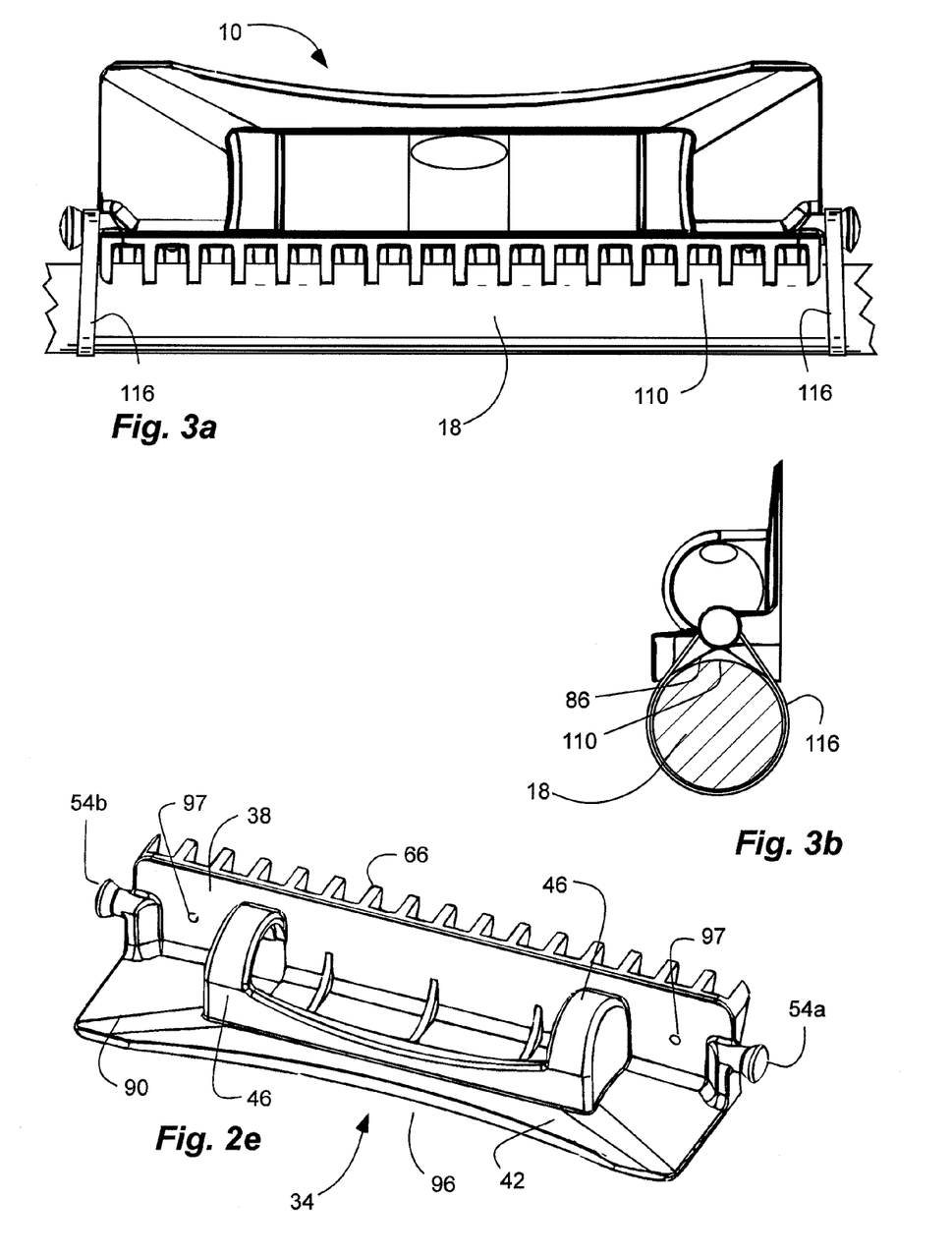

The level 10 can be secured by placing the level on a convex upper surface 110 of the hangable item (such as a towel bar 18), as shown in FIGS. 3a and 3b. The inclined bottom 78 of the inverted V-shaped profile 86 of the pair of opposite feet arrays 66 and 70 can receive the convex upper surface 110. Thus, the convex upper surface 110 of the hangable item can nest within the V-shaped profile or channel. In addition, an elongated strap 116 can be wrapped around the hangable item and the pair of knobs 54a and 54b. The elongated strap can be can be an elastic band or loop, or an adjustable length strap secured by a buckle or hook-and-loop type fastener. In the case of an elastic band, an elongated loop can be formed with both ends thereof looped around one of the pair of knobs 54a or 54b. Thus, the level can be releasably secured to a convex surface of the hangable item in a hands free manner to allow the user to hold and/or manipulate the hangable item or towel bar with the level secured thereto.

Figures 4A, 4B:
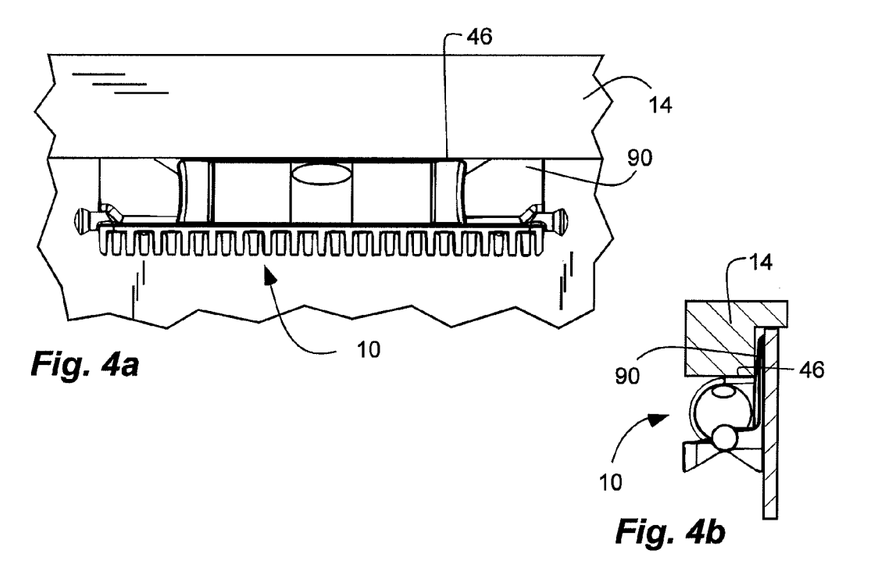
FIG. 4a is a front view of the level of FIG. 1a, shown disposed on a hangable item with a facing surface, namely a picture frame, in a hands free manner by press-fitting a fin between opposing faces of the picture frame and with a top of a housing of the level abutting the picture frame.
FIG. 4b is a side view of the level of FIG. 1a, shown disposed on the hangable item with the facing surface, namely a picture frame, in a hands free manner by press-fitting the fin between the opposing faces of the picture frame and with the top of the housing of the level abutting the picture frame.
Figures 4C, 4D:
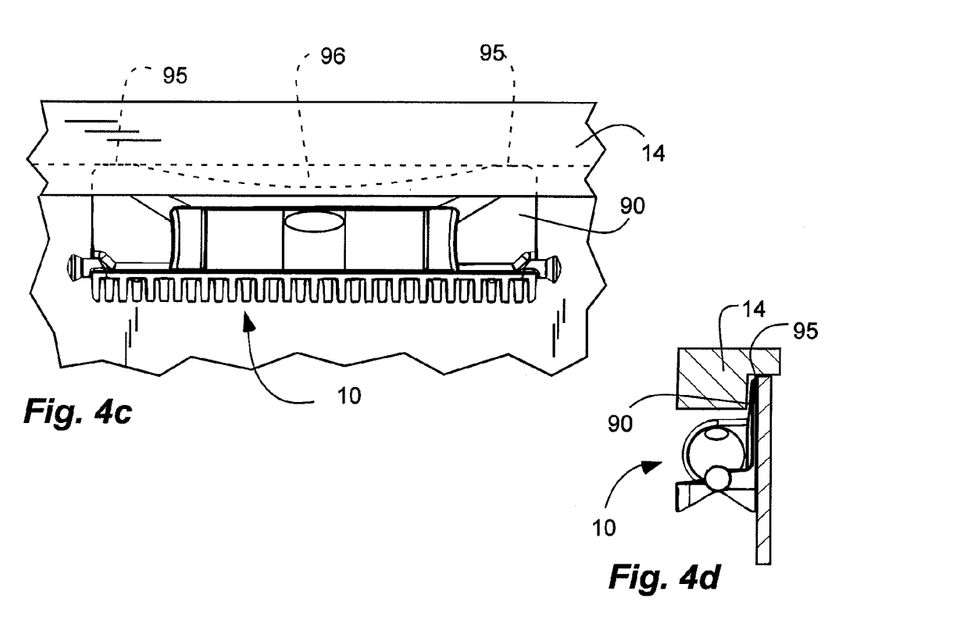
FIG. 4c is a front view of the level of FIG. 1a, shown disposed on the hangable item with the facing surface, namely a picture frame, in a hands free manner by press-fitting the fin between the opposing faces of the picture frame and with a pair of spaced-apart, uppermost top edges of the level abutting the picture frame.
FIG. 4d is a side view of the level of FIG. 1a, shown disposed on the hangable item with the facing surface, namely a picture frame, in a hands free manner by press-fitting the fin between the opposing faces of the picture frame and with the pair of spaced-apart, uppermost top edges of the level abutting the picture frame.
Figure 5A:
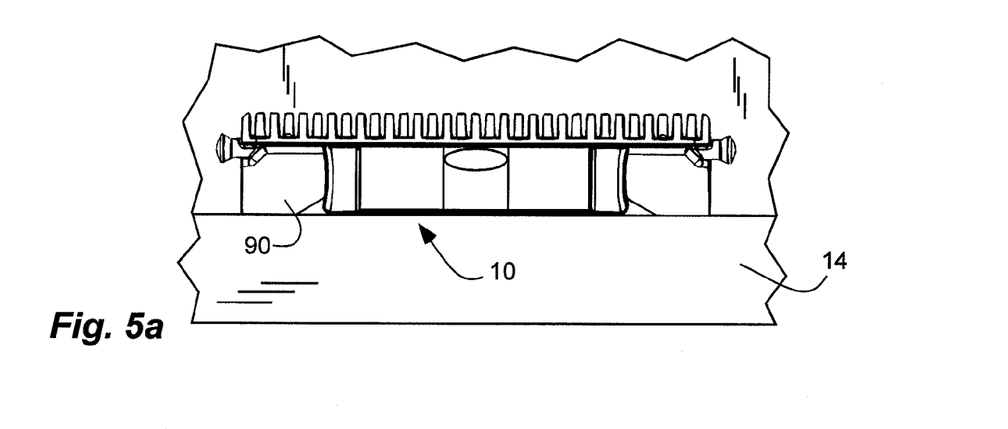
FIG. 5a is a front view of the level of FIG. 1a, shown disposed on a hangable item with facing surface, namely a picture frame.
Figure 5B:
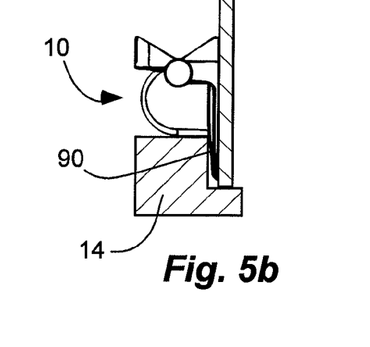
FIG. 5b is a side view of the level of FIG. 1a, shown disposed on a hangable item with facing surface, namely a picture frame.

The level 10 can be secured by inserting and wedging the fin 90 of the level between opposing faces of the hangable item (such as picture frame 14). The opposing faces can be the rear face of the picture frame and the front face of the picture of glass. Thus the opposing faces can be normally abutting faces, but for the fin disposed therebetween. The fin can remain between the faces by friction or press-fit. The fin can be inserted until the top 46 of the housing 34 (as shown in FIGS. 4a and 4b) or the pair of top edges 95 (as shown in FIGS. 4c and 4d) abut to the hangable item, or the picture frame. Again, the level can be releasably secured to the hangable item or picture frame with the fin in a hands free manner to allow the user to hold and/or manipulate the hangable item or picture frame with the level secured thereto.

The hangable item can be adjusted, such as tilting side-to-side, until the air bubble 26 in the level 10 is centered, indicating a level orientation. The position of the hangable item can be marked when level, or secured in place.

In accordance with another aspect of the present invention, the level and housing can include a magnet affixed to the housing to facilitate removable coupling of the level to certain objects containing ferrous metal.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A level device, comprising:
   a) an elongated, transparent, liquid-filled tube with an air bubble therein and having a longitudinal axis;
   b) a housing carrying the tube and having a bottom and a back and being open along a majority of a top and a front so that the air bubble is visible in the tube; and
   c) a pair of knobs extending beyond the housing on opposite sides thereof parallel with the longitudinal axis of the tube, each of the pair of knobs having an enlarged distal head.

2. A device in accordance with claim 1, further comprising:
   a pair of opposite feet arrays extending from the bottom of the housing including: a front feet array with front feet arrayed along a front of the bottom, and a rear feet array with rear feet arrayed along a rear of the bottom and off-set with respect to the front feet array, each feet array having a tall portion at the respective front or rear of the bottom and an inclined bottom tapering to a shorter raised portion towards a middle of the bottom defining an inverted V-shaped profile when viewed from the side.

3. A device in accordance with claim 2, wherein:
   the pair of knobs have a common axis parallel with an apex of the inverted V-shaped profile of the pair of opposite feet arrays.

4. A device in accordance with claim 2, wherein:
   the pair of knobs is located immediately above the apex of the inverted V-shaped profile of the pair of opposite feet arrays.

5. A method for leveling a hangable item using the device of claim 2, the method comprising:
   a) securing the level to the hangable item by selecting a securing configuration selected from:
      i) placing the level on a flat upper surface of the hangable item with the tall portion of the pair of opposite feet arrays disposed on the flat upper surface; or
      ii) placing the level on a convex upper surface of the hangable item with the inclined bottom of the inverted V-shaped profile of the pair of opposite feet arrays receiving the convex upper surface; and wrapping an elongated strap around the hangable item and the pair of knobs;
   b) adjusting the hangable item until the air bubble in the level is centered; and
   c) marking the position of the hangable item or securing the hangable item in place.

6. A device in accordance with claim 1, further comprising:
   a fin extending from the back of the housing behind the tube.

7. A device in accordance with claim 6, wherein:
   the fin has a top edge with a majority forming a concave profile when viewed from the front.

8. A device in accordance with claim 6, wherein:
   the fin has a top edge with a pair of spaced-apart, uppermost top edges defining a width therebetween greater than a length of the tube and separated by a concave indentation.

9. A device in accordance with claim 1, further comprising:
   a pair of apertures in the bottom of the housing; and a pair of pins or tacks insertable through the pair of apertures and into a board.

10. A level device, comprising:
a) an elongated, transparent, liquid-filled tube with an air bubble therein and having a longitudinal axis;
b) a housing carrying the tube and having a bottom and a back and being open along a majority of a top and a front so that the air bubble is visible in the tube;
c) a fin extending from a back of the housing behind the tube, the back having a flat back surface with the fin flush with the flat back surface;
d) the fin having a top edge with a pair of spaced-apart, uppermost top edges defining uppermost points of contact; and
e) a concave indentation in the top edge separating the pair of spaced-apart, uppermost top edges.

11. A device in accordance with claim 10, wherein the pair of top edges define a width therebetween greater than a length of the tube.

12. A device in accordance with claim 10, further comprising:
a pair of knobs extending beyond the housing on opposite sides thereof parallel with the longitudinal axis of the tube, each of the pair of knobs having an enlarged distal head.

13. A device in accordance with claim 12, further comprising:
a pair of opposite feet arrays extending from the bottom of the housing including: a front feet array with front feet arrayed along a front of the bottom, and a rear feet array with rear feet arrayed along a rear of the bottom and off-set with respect to the front feet array, each feet array having a tall portion at the respective front or rear of the bottom and an inclined bottom tapering to a shorter raised portion towards a middle of the bottom defining an inverted V-shaped profile when viewed from the side.

14. A device in accordance with claim 12, wherein:
the pair of knobs have a common axis parallel with an apex of the inverted V-shaped profile of the pair of opposite feet arrays.

15. A device in accordance with claim 12, wherein:
the pair of knobs is located immediately above the apex of the inverted V-shaped profile of the pair of opposite feet arrays.

16. A method for leveling a hangable item using the device of claim 10, the method comprising:
a) securing the level to the hangable item by inserting the top edge of the fin between opposing faces of the hangable item until a top of the housing or the pair of top edges of the fin abut to the hangable item, and with the fin remaining between the opposing faces by friction or press-fit;
b) adjusting the hangable item until the air bubble in the level is centered; and
c) marking the position of the hangable item or securing the hangable item in place.

17. A device in accordance with claim 10, further comprising:
a pair of apertures in the bottom of the housing; and
a pair of pins or tacks insertable through the pair of apertures and into a board.

18. A level device, comprising:
a) an elongated, transparent, liquid-filled tube with an air bubble therein and having a longitudinal axis;
b) a housing carrying the tube and having a bottom and a back and being open along a majority of a top and a front so that the air bubble is visible in the tube;
c) a pair of knobs extending beyond the housing on opposite sides thereof parallel with the longitudinal axis of the tube, each of the pair of knobs having an enlarged distal head;
d) a pair of opposite feet arrays extending from the bottom of the housing including: a front feet array with front feet arrayed along a front of the bottom, and a rear feet array with rear feet arrayed along a rear of the bottom and off-set with respect to the front feet array, each feet array having a tall portion at the respective front or rear of the bottom and an inclined bottom tapering to a shorter raised portion towards a middle of the bottom defining an inverted V-shaped profile when viewed from the side;
e) the pair of knobs having a common axis parallel with an apex of the inverted V-shaped profile of the pair of opposite feet arrays;
f) the pair of knobs located immediately above the apex of the inverted V-shaped profile of the pair of opposite feet arrays;
g) a fin extending from the back of the housing behind the tube; and
h) the fin having a top edge with a majority forming a concave profile when viewed from the front.

19. A device in accordance with claim 18, further comprising:
a pair of apertures in the bottom of the housing; and
a pair of pins or tacks insertable through the pair of apertures and into a board.

20. A method for leveling a hangable item using the device of claim 18, the method comprising:
a) securing the level to the hangable item by selecting a securing configuration selected from:
i) placing the level on a flat upper surface of the hangable item with the tall portion of the pair of opposite feet arrays disposed on the flat upper surface; or
ii) placing the level on a convex upper surface of the hangable item with the inclined bottom of the inverted V-shaped profile of the pair of opposite feet arrays receiving the convex upper surface; and wrapping an elongated strap around the hangable item and the pair of knobs; or
iii) inserting and wedging the fin of the level between opposing faces of the hangable item;
b) adjusting the hangable item until the air bubble in the level is centered; and
c) marking the position of the hangable item or securing the hangable item in place.

21. A method for leveling a hangable item, comprising:
a) obtaining a level having:
i) an elongated, transparent, liquid-filled tube with an air bubble therein and having a longitudinal axis;
ii) a housing carrying the tube and having a bottom and a back and being open along a majority of a top and a front so that the air bubble is visible in the tube;
iii) a pair of knobs extending beyond the housing on opposite sides thereof parallel with the longitudinal axis of the tube, each of the pair of knobs having an enlarged distal head;
iv) a pair of opposite feet arrays extending from the bottom of the housing including: a front feet array with front feet arrayed along a front of the bottom, and a rear feet array with rear feet arrayed along a rear of the bottom and off-set with respect to the front feet array, each feet array having a tall portion at the respective front or rear of the bottom and an inclined bottom tapering to a shorter raised portion towards a middle of the bottom defining an inverted V-shaped profile when viewed from the side; and v) a fin extending from a back of the housing behind the tube;

b) securing the level to the hangable item by selecting a securing configuration selected from:

i) placing the level on a flat upper surface of the hangable item with the tall portion of the pair of opposite feet arrays disposed on the flat upper surface; or ii) placing the level on a convex upper surface of the hangable item with the inclined bottom of the inverted V-shaped profile of the pair of opposite feet arrays receiving the convex upper surface; and wrapping an elongated strap around the hangable item and the pair of knobs; or iii) inserting and wedging the fin of the level between opposing faces of the hangable item;

c) adjusting the hangable item until the air bubble in the level is centered; and d) marking the position of the hangable item or securing the hangable item in place.

\* \* \* \* \*